United States Patent [19]

Stoll

[11] Patent Number: 4,682,535

[45] Date of Patent: Jul. 28, 1987

[54] GUIDE HOUSING FOR THE LINEARLY MOVING OUTPUT ELEMENT OF A CYLINDER ACTUATOR

[76] Inventor: Kurt Stoll, Lenzhalde 72, D-7300 Esslingen, Fed. Rep. of Germany

[21] Appl. No.: 714,680

[22] Filed: Mar. 21, 1985

[30] Foreign Application Priority Data

Mar. 30, 1984 [DE] Fed. Rep. of Germany ....... 3411823

[51] Int. Cl.⁴ ............................................ F16J 15/18

[52] U.S. Cl. ................................ 92/165 PR; 92/161; 92/169

[58] Field of Search .................. 92/165 PR, 161, 169, 92/165 R

[56] References Cited

U.S. PATENT DOCUMENTS

| | | | |
|---|---|---|---|
| 837,252 | 11/1906 | Rose | 92/161 X |
| 1,575,185 | 3/1926 | Stenhouse | 92/161 X |
| 3,180,236 | 4/1965 | Beckett | 92/169 X |
| 3,893,378 | 7/1975 | Hewitt | 92/169 X |
| 4,034,867 | 7/1977 | Akagawa | 92/165 RR X |
| 4,507,045 | 3/1985 | Valentine et al. | 92/165 PR X |

FOREIGN PATENT DOCUMENTS

| | | |
|---|---|---|
| 68088 | 6/1981 | European Pat. Off. . |
| 417377 | 10/1934 | United Kingdom . |
| 728038 | 4/1955 | United Kingdom . |

*Primary Examiner*—Larry Jones
*Attorney, Agent, or Firm*—McGlew and Tuttle

[57] ABSTRACT

A guide housing as a component of a linear actuator is made up of a barrel and two platforms integrally formed thereon and running the length thereof. The transition or join between each platform and the barrel is formed by a constricted part or waist of the guide housing. The outer face of the guide housing is convex over the barrel and concave over the constriction. The outer face of the barrel may have flats with grooves therein. The platforms have longitudinal holes or grooves in which fittings are adjustably mounted for setting and monitoring the stroke of the actuator.

8 Claims, 2 Drawing Figures

GUIDE HOUSING FOR THE LINEARLY MOVING OUTPUT ELEMENT OF A CYLINDER ACTUATOR

BACKGROUND OF THE INVENTION

The invention relates to a guide housing for the linearly moving output element of a cylinder actuator and furthermore to fittings for presetting and monitoring the action of the actuator.

A variety of such guide housings have already come into use. One aim of the invention is to design a compact form of a such housing.

A further object of the invention is to devise such a housing that is economical in the use of material.

A further object of the invention is to devise such a housing that may be produced at a low price.

As part of a still further aim, the invention seeks to make possible an actuator that may be simply and adjustably secured to a support plate or the like and which is well adapted for the connection of various fittings and accessories to it.

SHORT SUMMARY OF THE INVENTION

With a view to attaining these and further aims, in the invention such a guide housing is made up of a cylinder barrel and at least one platform extending over the axial length of the barrel to which it is integrally joined at a connection formed by a waist of the guide housing, the outer face of the guide housing being convex at the barrel and concave at the waist. Different further possible forms of the invention are defined in the claims.

In one possible form of the actuator at least one side of the barrel is flattened so that one or more abutment faces are formed. One of such abutment faces may be normal to the face delimiting the platform and the extent of the platform in a direction normal to the length direction of the barrel may be approximately equal to the outer diameter of the barrel. Such a design offers various advantages when it comes to stacking a number of such actuators to form a single block.

Each platform may have two grooves of key-hole cross section formed in it, the inner part of each such groove having a generally circular cross section leading into a constricted neck passage running in an outward direction opposite to a floor of the groove which is innermost. Such key-hole grooves are simple to produce with a high degree of precision and ensure an accurate guiding action.

The driving element of the actuator may be made up of a piston rod joined to a piston adapted to be driven backwards and forwards in the barrel, there furthermore being a rod, adapted to ensure linear motion, joining with the piston rod and running in a longitudinal hole in the guide housing. Such a design makes certain of accurately linear motion of the output element so that even if it is acted upon by sideways forces and moments the positioning action will still be precise. Since there are two such key-hole grooves, the output element is stabilized in the transverse direction and kept from turning, this, among other things, reducing wear of the packings of the guide housing.

It is furthermore possible for one end of the guide rod to be connected with the load, such end being guided in a longitudinal groove in the guide housing along the full stroke of the acutuator. This has the effect of optimally resisting lateral forces and moments acting on the output element by means of the guide housing.

As a further development of the invention, the guide rod bears a stop adapted to run up against a further stop attached on the housing to limit the stroke of the output element, such further stop being able to be adjusted in its position, as for example by way of a slide or rider that may be moved along and locked in one of the longitudinal grooves in the housing. Such a stop on the guide rod may furthermore be arranged to cooperate with a switch serving to reverse the actuator and being integrated with the said further stop or being arranged as a separate component that may be slid along one of the longitudinal grooves for adjustment and locked in place therein. One of the longitudinal grooves may serve as a means for mounting a sensor adapted to measure the displacement of the output element by reading a length scale present on the guide rod. Such an arrangement makes it possible for the guide housing to be readily connected with electronic or fluidic control components and for the manner of connection to be quickly grasped by visual inspection.

Further useful effects of the invention will be seen from the following account of one working example thereof as based on the accompanying drawings.

LIST OF FIGURES

DETAILED ACCOUNT OF WORKING EXAMPLE OF THE INVENTION

Figure 1:
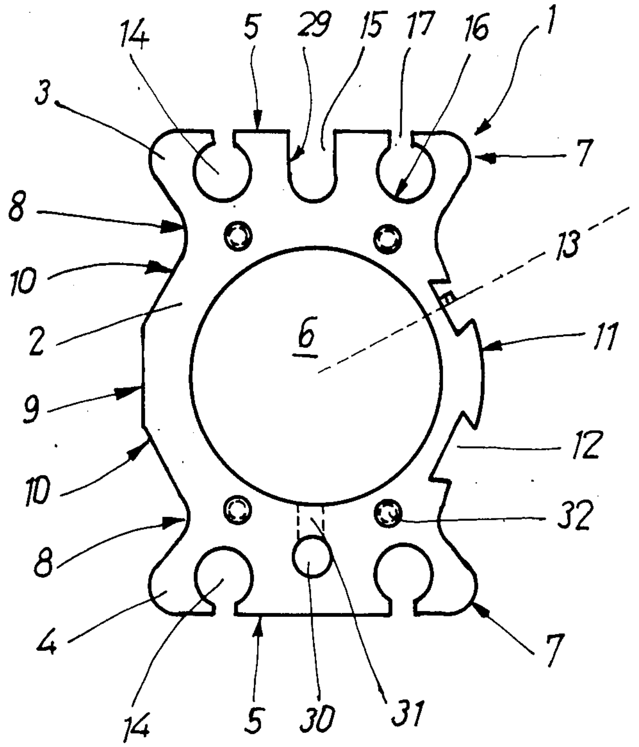
FIG. 1 is an end-on view of one form of guide housing.

The guide housing 1 is generally cylindrical, FIG. 1 showing it from one end and in outline. A central part of the housing 1 functions as a cylinder barrel 2 for a piston, not shown, for forming a piston and cylinder actuator. Two platforms 3 and 4 are molded on the barrel 2 and stretch along its full axial length. The platforms 3 and 4 are diametrally opposite to each other and have flat end faces 5 that are plane-parallel to each other and may be used as support faces for example. The basic shape of the barrel 2 is cylindrical. It has a central bore 6 for the piston with a circular cross section. Because of the platforms 3 and 4 formed on the two sides of the barrel 2 the outline of the cross section between the corners 7 of the guide housing 1 has an elongated, rectangular form.

The outer face of the guide housing 1 on to the barrel 2 is curved outwards, that is to say convexly curved. The transition to the platform 3 and 4 is the form of a waist or constriction 8 so that here the outer face of the guide 1 is curved in the opposite direction, viz. concavely. On the side of the housing to be seen on the right in FIG. 1 the generatrix of the outer face is smootly curved, whereas on the left hand side of the barrel 2 is flattened to form flat prismatic support faces 9 and 10. A central support face 9 is in this case perpendicular to the limiting faces 5 of the platforms 3 and 4. Such face 9 is between two flat support faces 10 in a symmetrical arrangement running inwards and respectively adjoining the constriction 8 or waist. The outer face of the left axial central part of the guide housing 1 consequently has the outline of a trapezoid.

On the other hand, the guide housing 1 has a rounded outline on the right hand side of FIG. 1. Such outer face is formed by the part 11 of a cyndrical face. The breadth of the guide housing 1 at the level of the piston bore 6 is equal to the distance between the perpendicular support face 9 and the part 11 of the outer face. The breadth of the housing decreases in a downward direction towards the constrictions 8 and becomes greater again at the platforms 3 and 4. The breadth of the platforms 3 and 4, that is to say their dimension in a direction normal to the longitudinal axis of the cylinder in the direction of the flat outer faces 5 is approximately equal to the outer diameter of the barrel 2 and preferably the platform breadth is somewhat less. The perpendicular support face 9 may therefore be used in aligning the guide housing 1 on a support face or to pack several guide housings of the present sort together and so form a stack thereof. The oblique support faces 10 adjoining the vertical support face 9 make it possible to align and mount the guide housing 1 in different, defined angular positions.

Having three support faces 9 and 10 is advantageous, but is not mandatory in the invention, and it is possible to have less or more support faces at the same angle or either of two different angles on the outer face of the barrel. It is furthermore possible to have flat support faces on the two sides of the barrel 2. Last but not least, it is possible to design the barrel so that it does not have any flats at all so that its outer faces on the two sides will then be part-cylindrical (not shown).

In the illustrated embodiment of the invention the outer face of the barrel 2 is designed with two grooves 12, that run in the length direction of the cylinder. The outer grooves 12 are placed on the side of the barrel 2 that is part-cylidrical in its curvature. In the working example shown they have the form of dovetail grooves, but the grooves might have other forms, as in the form of tee slots (not illustrated). The outer grooves 12 are placed so as to be bilaterally symmetrical with respect to a median plane of the barrel running parallel to the end faces 5 along the axis of the guide housing or bush 1. They are placed with an angle between them at the outer face of the barrel 2 and any median line 13 drawn normal to the floor of the groove in question will be radial with respect to the cylinder bore 6. The outer grooves 12 are used for connecting the guide housing 1 with assembly rails, not shown in detail, and/or for the attachment of various fittings. It will be clear that in place of two outer grooves it is possible to have only one or to have more than two of them. Furthermore, it is possible to form one or more outer grooves in addition or as an alternative at the outer support faces 9 and 10 as well.

The platforms 3 and 4 joined with the barrel 2 are also provided with guide means in the form of one or more axial longitudinal holes and/or longitudinal grooves 14 and 15. The latter then preferably open through the flat outer end faces 5. The longitudinal grooves 14 and 15 may for example have a circular, a tee or a dovetail cross section. A preferred from of groove outline to be seen at 14 has an inner part 16 with a part-circular section, the groove generally having a key-hole cross section with a narrow opening 17 where it opens to the outer end face 5. The groove opening 17 or neck is radial in relation to the outer end face 5. Of these part-circular or key-hole grooves 14 there are two in each platform 3 and 4 in the illustrated embodiment. They are symmetrically arranged in relation to a median plane of the barrel 2 normal to the end faces 5 and containing the center axis of the barrel. The longitudinal grooves 14 and 15 may have suitable slides (not shown) fitting in them so allow the guide housing 1 to be anchored on a platform plate, the base of a machine or the like. Because such slides may be adjusted along the longitudinal grooves 14, there is a great number of different ways of fixing the housing in place. Moreover the longitudinal grooves 14 may be used for guiding the linearly moving output element of an actuator, that is connected with a load, and guiding various fittings for presetting and monitoring the operation of the actuator, as is illustrated in FIG. 2.

Figure 2:
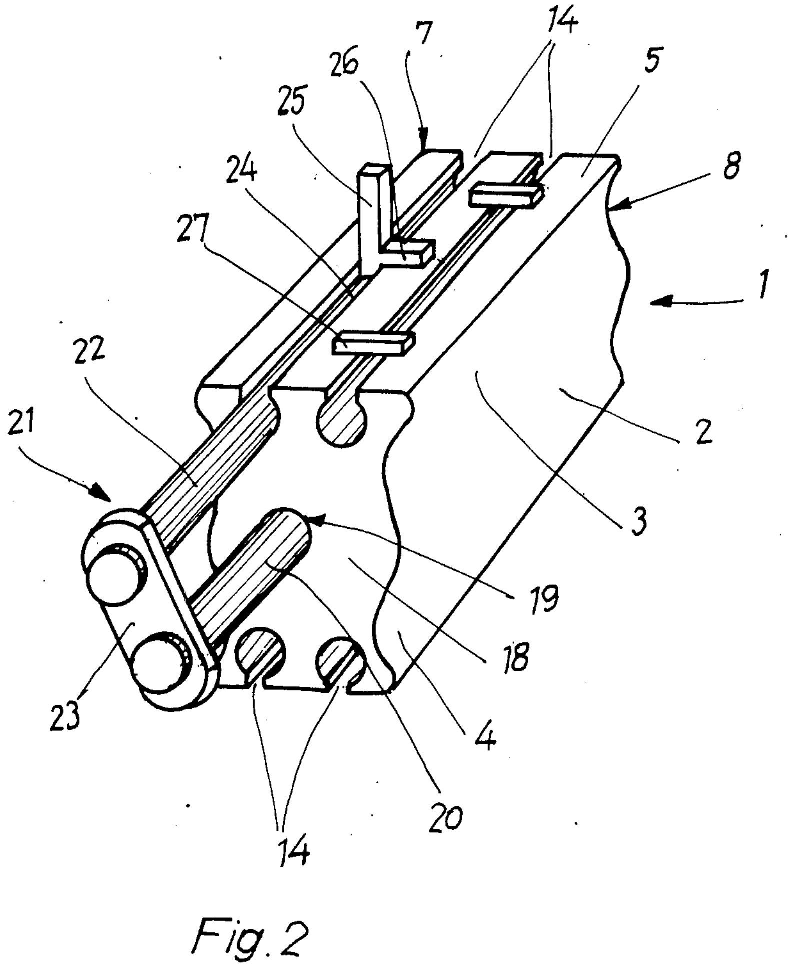
FIG. 2 is a perspective elevation of the guide housing as a component of a linear actuator.

FIG. 2 diagrammatically shows a linear actuator based on the use of the guide housing 1 and which is more specially hydraulically or pneumatically powered. The guide housing 1 is shut off at both ends by cylinder covers 18, of which one has an opening 19 for one end of the piston rod 20 protruding from the guide housing 1. The cylinder covers 18 are shaped to correspond to the form of the guide housing 1, and they are joined in some way not shown with the guide housing 1, as for example by screws. The piston rod 20 is joined with a piston that is not shown and it may be moved to and fro while making sealing contact with the bore 6 of the barrel. In the case of a single acting piston and cylinder actuator the piston defines one driving space in the bore 6 and in the case of a double acting piston and cylinder actuator it defines two piston driving spaces. Driving fluid is admitted to these driving spaces through suitable ports. When driving fluid is supplied under suitable control the piston rod 20 will travel to a greater or lesser extent out of the guide housing 1, the load being connected mechanically with the piston rod 20 or the guide housing 1.

In the set-up of FIG. 2 the load is mechanically connected with the actuator by way of a slide 21, that is guided for parallel motion by way of two rods. The first rod is in this case the piston rod 20 running centrally out through the cylinder end cover 18. The piston rod 20 is firmly joined to a second rod, here referred to as the guide rod 22, that is space from and parallel to it. The connection may be for example by way of a lug 23. The guide rod 22 is has a circular cross section. It moves into one of the longitudinal grooves 14 in the guide housing 1, in which it has a running fit. The two-rod guiding system for the slide or output element 21 ensures that the arrangement of the invention runs with a high degree of stability as regards resisting lateral forces and moments. Inacurracy in the positioning of the piston rod 20 is avoided, and the guide rod 22 at the same time functions as a means for keeping the piston and cylinder unit from swiveling.

It will be clear that the guide rod 22 may run in an axial or longitudinal hole in the guide housing rather than in a longitudinal groove 14 that is open on one side. The arrangement to be seen in FIG. 2 however does open up advantageous possibilities as regards connecting the slide or output element 21 with a load. The position of load connection is at one end 24 of the guide rod 22, that is guided for the full stroke of the linear actuator in the longitudinal groove 14. This end 24 is joined with a strut 25 or the like. The strut 25 projects out through the narrow opening 17 of the longitudinal groove 14 from the guide housing 1. This strut may then be readily joined to various fittings that are to be driven, actuated or acted upon by a force for some other purpose. Furthermore, the function of the linear actuator may readily be monitored by detecting the position of the strut 25.

The guide rod 22 as in FIG. 2 carries a stop 26, that is adapted to limit the stroke of the slide-like output element 21 by running up against fixed stops 27. The stops 27 are held in a longitudinal groove 14 in the same platform 3, which also has the longitudinal groove 14 for the guide rod 22 therein. The stops may be shifted along in the length direction of the guide housing 1 and locked in given positions. More particularly, it is possible for the fixed stops 27 to be fixed on a slide fitting in the groove 14 and which may be locked in place therein, for example by a screw. The fixed stops 27 may be combined with switches, that are used for reversing the linear actuator, more especially by changing round the admission of driving fluid to the piston driving space or spaces in the cylinder. It is furthermore possible to have separate limit switches that may be shifted along one of the longitudinal grooves and locked at given positions therein, this again being something that may be undertaken using slides fitting into the groove. Lastly, one of the longitudinal grooves can mount a switch (not shown) for measuring the displacement of the slide-like output drive element 21. The sensor then reads a length scale on the guide rod 22 and produces a signal corresponding to the position of the slide, such signal then being used for controlling the linear actuator.

The longitudinal grooves in the second platform 4 shown at the bottom in FIG. 2 in the illustrated construction do not bear control units, although this clearly may be the case. These grooves are preferably used for the attachment of the guide housing 1 to guide ribs, a base plate, the base of a machine or the like, similar slides in the grooves being used to the those employed for attachment of the housing of the fixed stops 27, switches for sensors as noted supra.

Reverting to FIG. 1, it will be seen that in addition to the grooves 12 and 14 there may be further longitudinal channels 15 for the purpose of guiding and/or for saving weight. The channel 15 to be seen in the middle of the top platform 3 has an oval cross section with a smoothly round inner part with sides 29 running outwards therefrom towards and at a right angle to the end face 5. The guide housing 1 furthermore has a connection hole 30 for the admission of driving fluid to the linear actuator. The connection hole 30 is in the form of a blind hole in one of the platforms 3 and 4 generally in the middle between the longitudinal grooves 14. A duct 31 runs off from this connection hole 30 inside the guide housing 1, such duct producing a connection with the one of the piston driving spaces of the linear actuator. Furthermore it will be seen from FIG. 1 that there are attachment holes 32, that may be for example blind tapped holes. A cylinder cover is screw to the guide housing 1 using such holes.

The invention is not limited to the embodiment illustrated in which the barrel 2 has two platforms 3 and 4 formed thereon. It would for example be possible to have a construction in which there were only one platform. Furthermore the piston rod 20 may protrude from both ends of the guide housing 1 and just from one end as illustrated, such two protruding ends being joined to the two end of suitably lengthened guide rod 22 (not shown). Lastly it is possible to have more that one guide rod into order to stabilize the travel of the slide-like output driven element 21.

I claim:

1. A guide housing and linearly drivable element adapted for connection with a load, comprising: a cylindrical barrel forming part having a cylindrical barrel bore extending axially therethrough, at least one pedestal platform body running along the axial length of said barrel forming part and made as one piece therewith, a piston movable axially in said barrel bore, said barrel forming part being joined to said pedestal platform body by a transition, said transition representing a waist of said pedestal platform body such that an outer face of said cylindrical barrel forming part is convexed over said barrel bore and said waist is concave, a piston rod connected to said piston and extending out of said barrel forming part, said pedestal platform body having a groove extending axially therein parallel to said barrel bore, said groove being open to the outer face of said pedestal platform body along the axial length of said pedestal platform body, a guide rod extending in said groove and parallel to said piston rod, said guide rod being fixed to said piston rod for movement with said piston rod, and a strut fixed to said guide rod and slideable along said opening of said groove for movement along said groove with movement of said guide rod and piston rod.

2. The actuator as claimed in claim 1 comprising a stop mounted on said guide rod for limiting the stroke of said piston element and a counter-stop for engagement by said stop on said guide rod, said counterstop being able to be adjusted in its position along said housing.

3. The actuator as claimed in claim 2 comprising a shoe fitting into a longitudinal groove in said housing and having said counter-stop fixed thereto, said shoe having screw means for locking into place in said groove.

4. A guide housing and linear driveable element according to claim 1, including a second pedestal platform body diametrically opposed from said first mentioned pedestal platform body and running along the axial length of said barrel forming part and mode as one piece with said barrel forming part.

5. A guide housing and linear driveable element according to claim 1, wherein said barrel forming part includes an outer axially extending flat abuttment face on said convex outer face of said barrel forming part.

6. A guide housing and linearly driveable element according to claim 1 wherein said pedestal platform body has a width measured perpendicularly to the axial length which is approximately equal to the diameter of said barrel forming part.

7. A guide housing and linear driveable element according to claim 1, including a groove having a tee-shaped cross section taken perpendicularly to the axial length and disposed in and extending axially along said barrel forming part.

8. A guide housing and linear driveable element according to claim 1, wherein said groove comprises a cylindrical opening extending axially through said barrel forming part, said opening of said groove to the outside of said barrel forming part being smaller in a dimension perpendicularly to the axial direction than the diameter of said groove to form a key-hole cross section groove.

* * * * *